May 25, 1954

H. J. HORN 2,679,304

BRAKE DRUM

Filed May 21, 1949

Inventor
HARRY J. HORN
By Barnes, Kisselle, Laughlin & Raisch
Attorneys

May 25, 1954  H. J. HORN  2,679,304
BRAKE DRUM

Filed May 21, 1949  3 Sheets-Sheet 2

Inventor
HARRY J. HORN
By Barnes, Kisselle, Laughlin & Raisch
Attorneys

May 25, 1954  H. J. HORN  2,679,304
BRAKE DRUM

Filed May 21, 1949  3 Sheets-Sheet 3

Inventor
HARRY J. HORN
BY
Barnes, Kisselle, Laughlin & Raisch
Attorneys

Patented May 25, 1954

2,679,304

UNITED STATES PATENT OFFICE 2,679,304

BRAKE DRUM

Harry J. Horn, Lansing, Mich., assignor to Motor Wheel Corporation, Lansing, Mich., a corporation of Michigan Application May 21, 1949, Serial No. 94,618

2 Claims. (Cl. 188—218)

This invention relates to a brake drum.

It is an object of this invention to produce a brake drum which is constructed so that the braking ring will be free to expand or warp out of circular shape under the influence of the pressure exerted by the brake shoes and thereby enable the braking ring to make braking contact with the shoes around the entire braking surface of the shoes so that a better braking action will be obtained.

Figure 1:
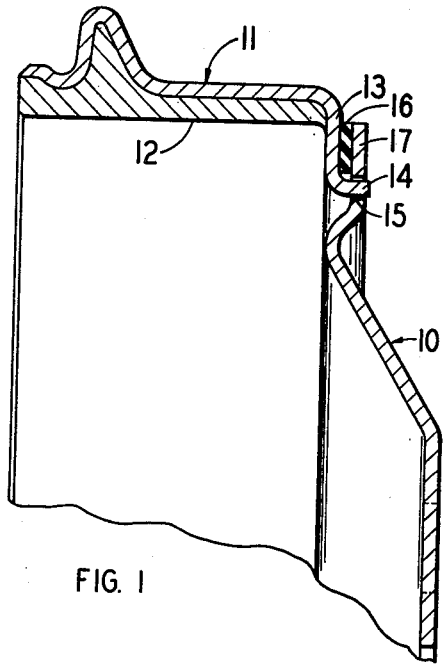
Figure 1 is a sectional view taken along the lines 1—1 of Figure 2 showing one form of brake drum construction of my invention.

Referring to the drawings, the brake drum of this invention comprises a brake drum back 10 on which is mounted a brake ring 11 which extends around back 10 in the form of an axially extending peripheral flange. Brake ring 11 is preferably provided with a liner 12 which is cast against the inner surface of the brake ring. In brake drums of conventional design the brake drum back and the braking ring are formed as an integral unit or as separate pieces with the brake ring firmly anchored around the periphery of the brake drum back. In the brake drum of my construction the brake ring 11 is mounted on the brake drum back 10 so as to be capable of limited movement relative to the drum back. More specifically, the braking ring is mounted on the drum back so as to be capable of readily expanding or distorting out of circular shape under the influence of the pressure exerted by the brake shoes. This result is effected by a limited floating connection between the braking ring 11 and the brake drum back 10 which is the basic feature of my invention.

The particular construction by which the braking ring is floatingly mounted on the brake drum back 10 may take several forms. It is desirable however in many instances that the brake ring be limited in the amount of movement that it can have in relation to the drum back so that the means employed for allowing freedom of movement between the ring and the drum back will not be excessively stressed.

I have shown in Figures 1 through 6 and 9 through 12 the use of rubber or other material having the elastic properties of rubber for connecting the brake ring to the drum back. As is shown in Figure 1 the connection between the braking ring and the drum back may be effected by forming an inwardly extending radial flange 13 around the inner edge of brake ring 11, the flange 13 being provided with spaced lugs or tongues 14 which extend into openings or notches 15 spaced circumferentially around drum back 10 inwardly from the peripheral edge thereof. The openings 15 are slightly larger than tongues 14 so as to permit the ring to have a limited amount of radial and circumferential movement relative to drum back 10. Ring 11 and drum back 10 are secured together by means of an annular pad 16 formed of rubber or other material having elastic properties. Pad 16 is vulcanized or otherwise secured to the confronting faces of flange 13 on ring 11 and the peripheral flange portion 17 on drum back 10.

Figure 2:
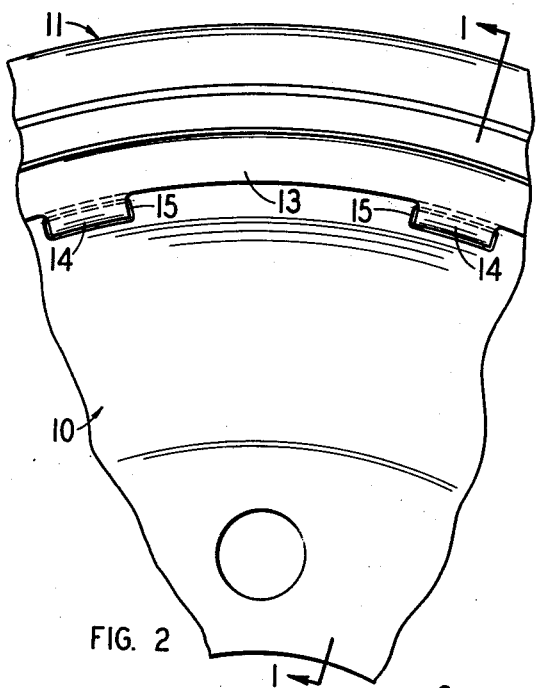
Figure 2 is a fragmentary elevation of the brake drum shown in Figure 1.
Figure 3:
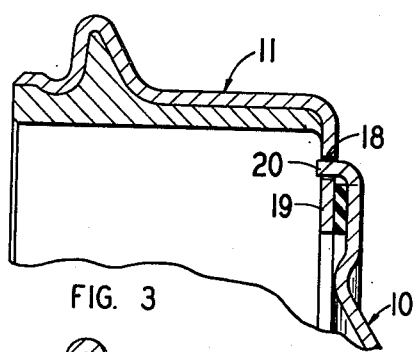
Figure 3 is a sectional view taken substantially along the lines 3—3 in Figure 4.
Figure 4:
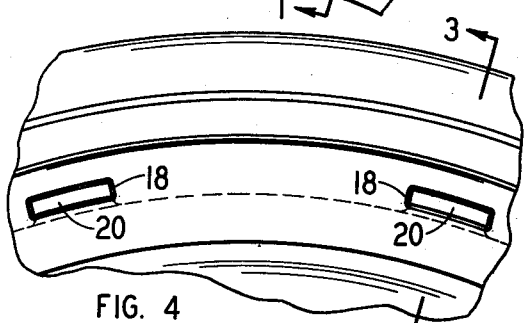
Figure 4 is a fragmentary elevation of another form of brake drum construction of this invention.
Figure 5:
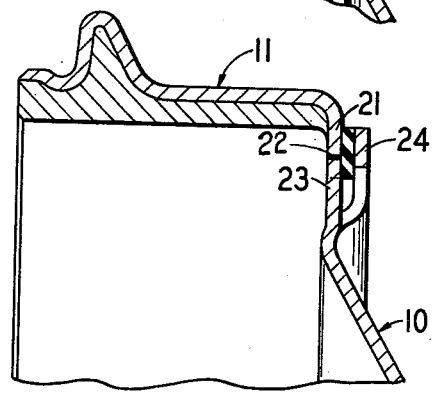
Figure 5 is a sectional view taken along lines 5—5 in Figure 6.
Figure 6:
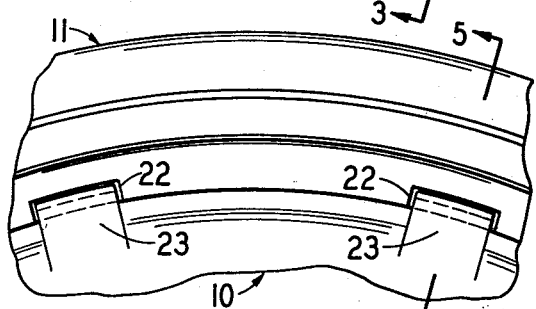
Figure 6 is a fragmentary elevation of a third form of brake drum construction of this invention.
Figure 7:
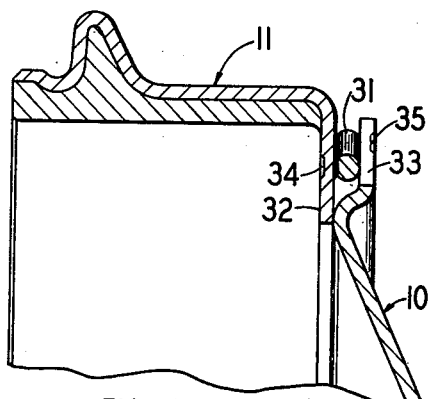
Figure 7 is a sectional view taken along the lines 7—7 in Figure 8.
Figure 8:
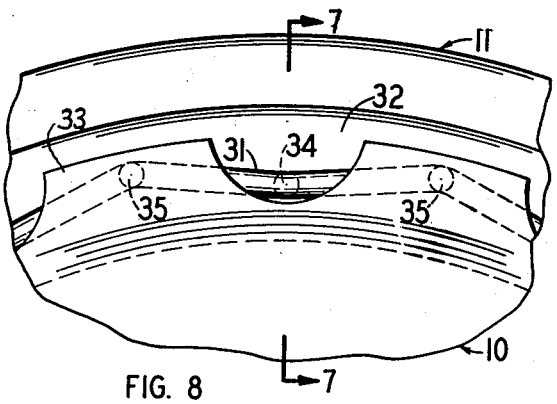
Figure 8 is a fragmentary elevation of another form of brake drum construction of this invention.
Figure 9:
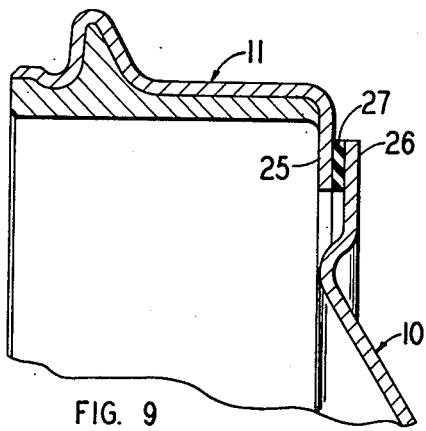
Figure 9 is a sectional view taken along the lines 9—9 in Figure 10.
Figure 10:
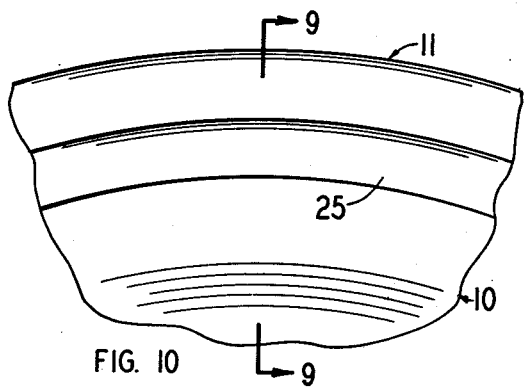
Figure 10 is a fragmentary elevation of a further modified form of brake drum construction of this invention.
Figure 11:
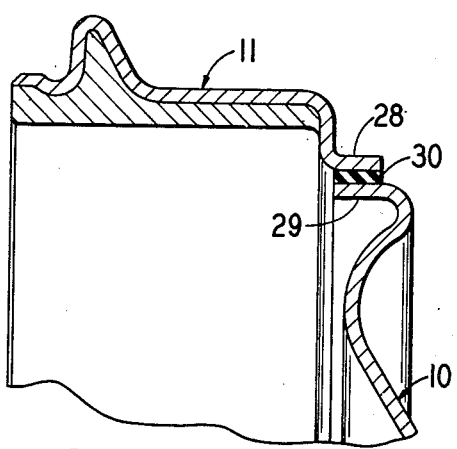
Figure 11 is a sectional view taken along the lines 11—11 in Figure 12.
Figure 12:
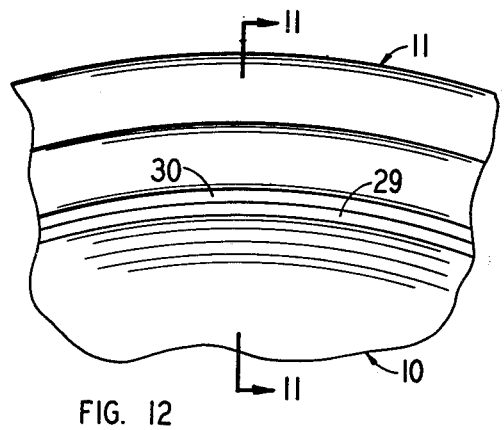
Figure 12 is a fragmentary elevation of another form of brake drum construction of this invention.

The construction shown in Figures 3 and 4 is somewhat similar to that shown in Figures 1 and 2 with the exception that the openings 18 are formed on the inwardly extending radial flange 19 of the braking ring and the axially projecting tongues 20 are formed around the periphery of the drum back so as to project into openings 18. In the construction shown in Figures 5 and 6 the inwardly extending radial flange 21 on the brake ring is provided with a plurality of circumferentially spaced notches 22 which cooperate with radial tongues 23 on the brake back so as to limit the relative radial and circumferential movement of these members. Pad 16 is vulcanized at one face to flange 21 and tongues 23 and at its other face the pad is vulcanized to a peripheral flange 24 on back 10 which is offset axially from tongues 23.

Where lighter braking loads are employed the brake ring may be mounted on the drum back in the manner shown in Figures 7 through 12. In the construction shown in Figures 9 and 10 the brake ring and brake back are each formed with overlapping radial flanges 25 and 26 respectively. The elastic pad is in the form of a flat rubber ring 27 vulcanized to the confronting faces of flanges 25 and 26. In Figures 11 and 12 the brake ring and drum back are formed with axially extending flanges 28 and 29, respectively, to the opposing faces of which is vulcanized an axially extending rubber ring 30. It will be appreciated that means, other than the rubber pads described above, may be used for floatingly mounting the brake ring on the drum back. If desired, a metallic connection such as shown in Figures 7 and 8 may be employed for this purpose. In this construction a wire ring 31 is interposed between radial flanges 32 and 33 on the brake ring and drum back respectively. Ring 31 has a scalloped contour and is secured as by spot welding alternately to the braking ring as at 34 and to the drum back as at 35. In this type of construction braking ring 11 is permitted a small amount of circumferential movement relative to the drum back 10 by means of the scalloped contour of wire ring 31 and its movement in radial direction is permitted by the flexing of the wire.

Figure 13:
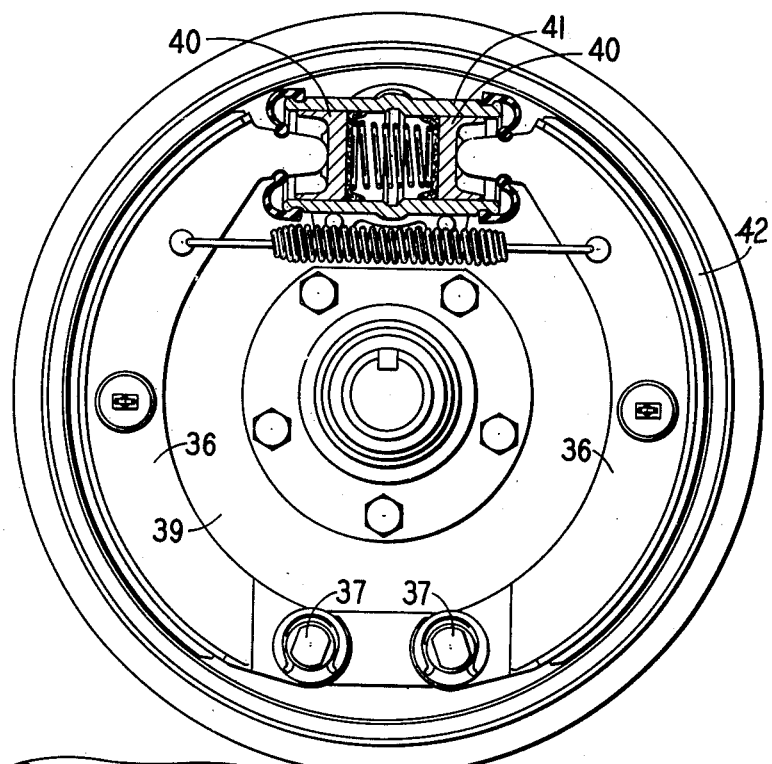
Figure 13 is an elevation of a conventional brake assembly.
Figure 14:
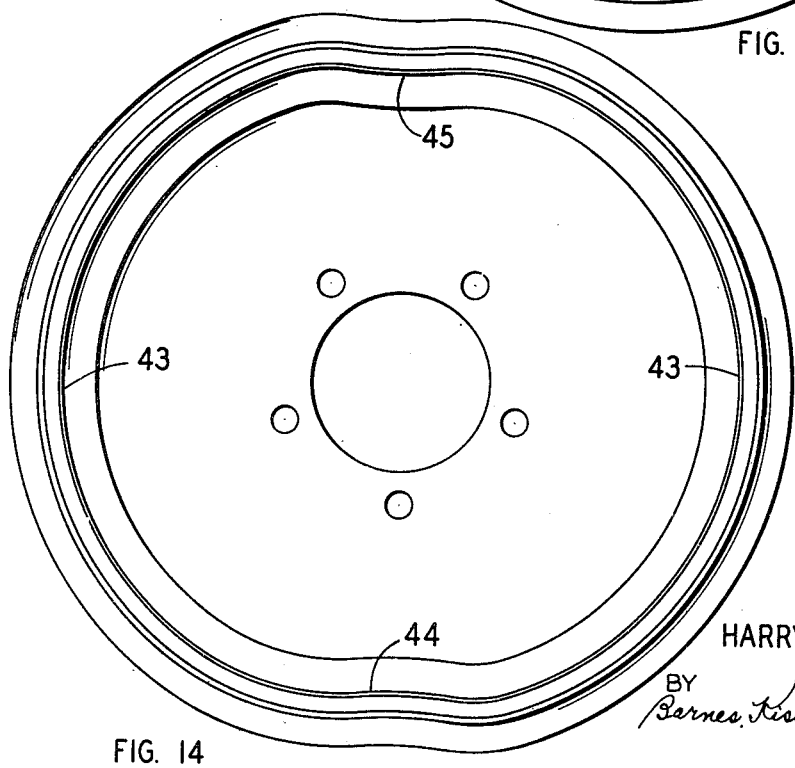
Figure 14 is a plan view of a drum showing in a highly exaggerated condition the distortion that occurs when the brake shoes are forced into the braking ring.

In Figure 13 there is shown a conventional brake assembly wherein a pair of arcuately shaped brake shoes 36 are pivotally anchored at one end as at 37 on a backing plate 39 with their opposite ends arranged to be shifted outwardly by means of a pair of opposed pistons 40 hydraulically actuated within cylinder 41. When brake shoes 36 are forced into engagement with the surrounding braking ring 42, as by the outward movement of pistons 40 when the brakes are applied, the braking ring distorts to a configuration shown highly exaggerated in Figure 14. The braking ring does not stretch appreciably when the brakes are applied but it does distort noticeably under the influence of the load applied by the brake shoes. When shoes 36 expand outwardly into engagement with ring 42 the ring warps out of circular shape and follows the contour of the shoes. The distortion which occurs is not very large from the standpoint of dimensional changes in the drum but the action is, however, very pronounced. This distortion occurs as a radially outward movement in the vicinity of the central portion of each shoe as at 43 and a radially inwardly movement of the braking ring in the area between the ends of the opposite shoes; that is, as at 44 in the vicinity of the pivots 37 and at 45 in the vicinity of the other ends of the brake shoes. The amount of distortion of ring 42 which takes place varies slightly with different types of brakes and in accordance with the load applied by the shoes. However, in all brakes of this type with which I am familiar, this distortion does occur.

It will be appreciated that if the braking ring is permitted to distort and follow the contour of the shoe so that the brake shoe engages the braking ring along the entire braking surface of the shoe a very efficient braking action will be obtained and a more uniform wear will be effected. The ease with which the braking ring will be permitted to distort out of shape so as to follow the contour of the brake shoes will depend upon the rigidity of the braking ring and this, of course, will be determined to a large extent by the manner in which the braking ring is anchored or secured to the drum backing member. By mounting the braking ring on the backing member so as to permit the ring to move freely within limits with respect to the backing member, it will be seen that the brake drum construction of this invention greatly improves the braking action obtained and tends to promote more uniform wear of the brake drum and brake shoes.

The term "rubber" is used herein in a broad sense to include both natural and synthetic rubber.

What I claim is:

1. A brake drum comprising an annular braking ring having an axially extending braking surface with which arcuately shaped brake shoes are adapted to expand into engagement, a backing plate for supporting said braking ring, said braking ring and backing plate having overlapping flange portions, and a resilient wire ring spacing said flange portions apart and connecting said braking ring to said backing plate, said wire ring having an undulating contour with its successive undulating portions connected at circumferentially spaced points alternately with said overlapping flange portions of said braking ring and said backing member, said wire ring being sufficiently resilient to be readily flexed radially and circumferentially by said braking ring when the braking ring is distorted by reason of the pressure exerted on said braking surface by said brake shoes.

2. A brake drum comprising an annular braking ring having an axially extending braking surface with which arcuately shaped brake shoes are adapted to expand into engagement, a drum backing member for supporting said braking ring, said braking ring having a radially inwardly extending flange along one edge of said braking surface, said drum backing member having a portion in overlapping relation with said radial flange on the braking ring, and a resilient wire ring disposed between said radial flange and said overlapping portion, said resilient wire ring being connected at successive circumferentially spaced points alternately with said radial flange and said overlapping portion, said wire ring being sufficiently resilient to be readily flexed radially and circumferentially by said braking ring when the braking ring is distorted by reason of the pressure exerted on said braking surface by said brake shoes.

References Cited in the file of this patent

UNITED STATES PATENTS

| Number | Name | Date |
| --- | --- | --- |
| 1,690,151 | Woodbury | Nov. 6, 1928 |
| 1,925,278 | Paton | Sept. 5, 1933 |
| 1,947,782 | Lejeune | Feb. 20, 1934 |
| 1,964,054 | Harris | June 26, 1934 |
| 2,099,833 | Van Halteren | Nov. 23, 1937 |
| 2,123,614 | Sinclair | July 12, 1938 |

FOREIGN PATENTS

| Number | Country | Date |
| --- | --- | --- |
| 831,661 | France | June 13, 1938 |